United States Patent
Kim et al.

(10) Patent No.: US 9,860,853 B2
(45) Date of Patent: Jan. 2, 2018

(54) APPARATUS AND METHOD FOR CONTROLLING TRANSMIT POWER

(71) Applicant: ELECTRONICS AND TELECOMMUNICATIONS RESEARCH INSTITUTE, Daejeon (KR)

(72) Inventors: Byoung-Hak Kim, Daejeon (KR); Jae-Hwan Kim, Daejeon (KR); Cheol-Ho Shin, Daejeon (KR); Mi-Kyung Oh, Daejeon (KR); Sang-Sung Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 221 days.

(21) Appl. No.: 14/942,059

(22) Filed: Nov. 16, 2015

(65) Prior Publication Data
US 2016/0142982 A1  May 19, 2016

(30) Foreign Application Priority Data
Nov. 17, 2014 (KR) .................. 10-2014-0160216

(51) Int. Cl.
*H04W 52/24* (2009.01)
*H04W 52/28* (2009.01)
*H04B 17/318* (2015.01)

(52) U.S. Cl.
CPC ........ *H04W 52/245* (2013.01); *H04B 17/318* (2015.01); *H04W 52/283* (2013.01); *H04W 52/242* (2013.01)

(58) Field of Classification Search
None
See application file for complete search history.

(56) References Cited

U.S. PATENT DOCUMENTS

| 8,606,312 | B2 | 12/2013 | Song | |
|---|---|---|---|---|
| 2012/0163195 | A1 | 6/2012 | Son | |
| 2015/0029869 | A1* | 1/2015 | Wolcott | H04B 3/487 370/242 |
| 2016/0037305 | A1* | 2/2016 | Pan | G01S 5/0252 455/456.1 |

FOREIGN PATENT DOCUMENTS

| KR | 10-2012-0071829 A | 7/2012 |
|---|---|---|
| KR | 10-1310901 B1 | 9/2013 |
| KR | 10-2014-0024882 A | 3/2014 |

* cited by examiner

*Primary Examiner* — Christine Duong

(57) ABSTRACT

Disclosed herein is an apparatus for controlling transmit power, including: a global positioning system (GPS) receiving unit receiving GPS signals from one or more satellites and measuring signal strengths of the GPS signals; a processor calculating transmit power corresponding to a current position depending on the GPS signals according to a predefined command; a memory storing the command therein; and a communication interface transmitting a data signal including data depending on the transmit power.

7 Claims, 4 Drawing Sheets

APPARATUS AND METHOD FOR CONTROLLING TRANSMIT POWER

CROSS REFERENCE TO RELATED APPLICATION

This application claims the benefit of Korean Patent Application No. 10-2014-0160216, filed on Nov. 17, 2014, entitled "Apparatus and Method for Controlling Transmit Power", which is hereby incorporated by reference in its entirety into this application.

BACKGROUND OF THE INVENTION

1. Technical Field

The present invention relates to an apparatus and a method for controlling transmit power operated in a unidirectional communication system.

2. Description of the Related Art

Generally, in a bidirectional communication system in which a mobile terminal and a base station are present, the mobile terminal may measure a strength of a signal transmitted from the base station and input thereto, and the base station may measure a strength of a signal transmitted from the mobile terminal and input thereto.

However, in a system using only unidirectional communication from the mobile terminal to the base station, the base station may measure a strength of a signal transmitted from the mobile terminal and input thereto. However, since the base station does not transmit a signal, the mobile terminal may not measure a strength of a signal output from the base station. Since the mobile terminal may not know path loss of a transmitter and a receiver, in the case in which the mobile terminal recognizes its position and a position of the base station, a transmit output of the mobile terminal is generally controlled depending on a distance on the basis of information on the position of the mobile terminal and the position of the base station.

However, in the case of using only the information on the positions, path loss between the mobile terminal and the base station is estimated using only the information on the positions. In this case, a problem that the path loss may be changed when a specific object, for example, a mountain, a building, air, a fog, a cloud, rain, snow, or the like, is present between the mobile terminal and the base station may be overlooked.

SUMMARY OF THE INVENTION

An object of the present invention is to provide an apparatus for controlling transmit power capable of controlling the transmit power in a unidirectional communication system.

According to an aspect of the present invention, there is provided an apparatus for controlling transmit power, including: a global positioning system (GPS) receiving unit receiving GPS signals from one or more satellites and measuring signal strengths of the GPS signals; a processor calculating transmit power corresponding to a current position depending on the GPS signals according to a predefined command; a memory storing the command therein; and a communication interface transmitting a data signal including data depending on the transmit power, wherein the command includes commands for performing: calculating free-space path loss (FSPL) between the current position and a base station depending on the GPS signals; calculating an FSPL difference, which is a difference between FSPL at a previous position and FSPL at the current position; calculating a GPS signal strength difference, which is a difference between an average of strengths of the respective GPS signals corresponding to the previous position and an average of strengths of the respective GPS signals corresponding to the current position; and calculating the transmit power corresponding to the current position by adding transmit power corresponding to the previous position, the FSPL difference, and the GPS signal strength difference to one another.

The calculating of the FSPL between the current position and the base station depending on the GPS signals may include: calculating a spaced distance between the current position and the base station; and calculating the FSPL between the current position and the base station depending on the spaced distance.

The command may further include a command for performing: storing the FSPL between the current position and the base station, the transmit power at the current position, and the strengths of the GPS signals corresponding to the current position.

The apparatus for controlling transmit power may further include a sensor measuring an environment to generate the data.

According to another aspect of the present invention, there is provided a method for controlling transmit power by an apparatus for controlling transmit power, including: receiving GPS signals from one or more satellites; measuring signal strengths of the GPS signals; calculating FSPL between a current position and a base station depending on the GPS signals; calculating an FSPL difference, which is a difference between FSPL at a previous position and FSPL at the current position; calculating a GPS signal strength difference, which is a difference between an average of strengths of the respective GPS signals corresponding to the previous position and an average of strengths of the respective GPS signals corresponding to the current position; and calculating transmit power corresponding to the current position by adding transmit power corresponding to the previous position, the FSPL difference, and the GPS signal strength difference to one another.

The calculating of the FSPL between the current position and the base station depending on the GPS signals may include: calculating a spaced distance between the current position and the base station; and calculating the FSPL between the current position and the base station depending on the spaced distance.

The method for controlling transmit power may further include storing the FSPL between the current position and the base station, the transmit power at the current position, and the strengths of the GPS signals corresponding to the current position.

The method for controlling transmit power may further include: measuring an environment to generate the data; and transmitting a data signal including the data depending on the transmit power.

DESCRIPTION OF THE EXEMPLARY EMBODIMENTS

Figure 1:
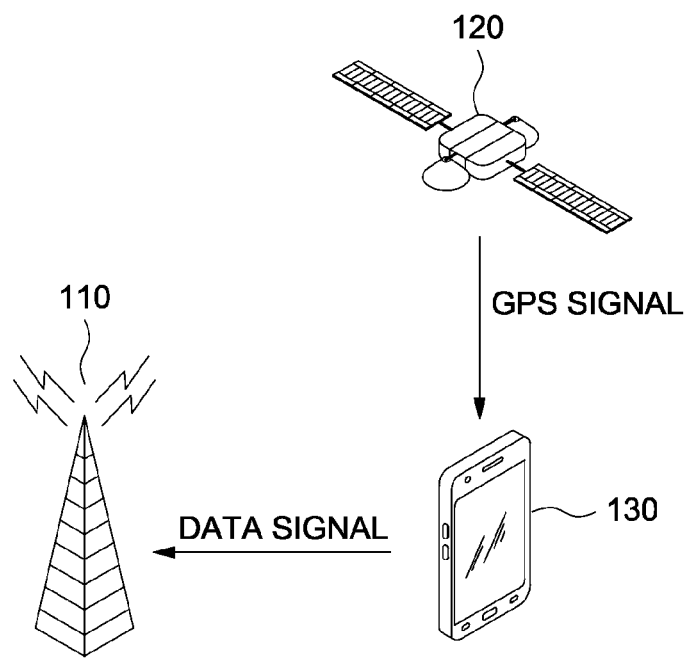
FIG. 1 is a view illustrating a unidirectional communication system according to an exemplary embodiment of the present invention.

The present invention may be variously modified and have several exemplary embodiments. Therefore, specific exemplary embodiments of the present invention will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention.

When it is decided that a detailed description for the known art related to the present invention may unnecessarily obscure the gist of the present invention, the detailed description will be omitted. In addition, ordinal numbers (for example, first, second, and the like) used in describing the present specification are identification symbols for distinguishing one component from another component.

Further, in the present specification, it is to be understood that when one component is referred to as being "connected to" or "coupled to" another component, one component may be connected directly to or coupled directly to another component or be connected to or coupled to another component through other component intervening therebetween unless explicitly described to the contrary.

Hereinafter, exemplary embodiments of the present invention will be described in detail with reference to the accompanying drawings. In order to facilitate the general understanding in describing the present invention, the same reference numerals will be used to describe the same means regardless of drawing numbers.

FIG. 1 is a view illustrating a unidirectional communication system according to an exemplary embodiment of the present invention.

Referring to FIG. 1, the unidirectional communication system is configured to include a base station 110, a global positioning system (GPS) satellite 120, and an apparatus 130 for controlling transmit power.

The base station 110 receives a data signal from the apparatus 130 for controlling transmit power. Here, the data signal is a signal transmitted by the apparatus 130 for controlling transmit power in order to transmit data generated by the apparatus 130 for controlling transmit power. Here, since the base station 110 according to an exemplary embodiment of the present invention is a base station of the unidirectional communication system, it does not transmit a separate signal to the apparatus 130 for controlling transmit power.

The GPS satellite 120 is a satellite transmitting a GPS signal to the apparatus 130 for controlling transmit power in the known scheme. Here, although one GPS satellite 120 has been illustrated in FIG. 1, one or more GPS satellites 120 may transmit GPS signals to the apparatus 130 for controlling transmit power.

The apparatus 130 for controlling transmit power transmits a data signal including data pre-stored or generated in a predefined scheme to the base station 110. Here, the apparatus 130 for controlling transmit power receives the GPS signal from the GPS satellite 120 and measures a received signal strength indication (RSSI) indicating a strength of the corresponding GPS signal. Here, the apparatus 130 for controlling transmit power calculates path loss in consideration of a distance between the apparatus 130 for controlling transmit power and the base station 110 and the RSSI depending on the GPS signal. The apparatus 130 for controlling transmit power may adjust the transmit power depending on the path loss to transmit the data signal to the base station 110. Hereinafter, a configuration of the apparatus 130 for controlling transmit power and processes of controlling transmit power by the apparatus 130 for controlling transmit power will be described in detail.

Figure 2:
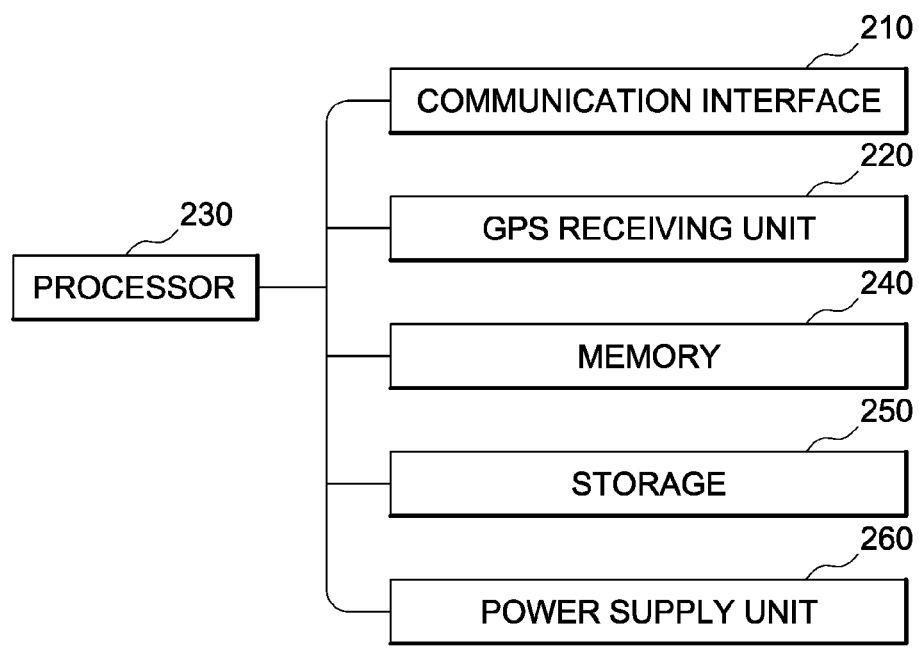
FIG. 2 is a block diagram illustrating an apparatus 130 for controlling transmit power according to an exemplary embodiment of the present invention.

FIG. 2 is a block diagram illustrating an apparatus 130 for controlling transmit power according to an exemplary embodiment of the present invention.

Referring to FIG. 2, the apparatus 130 for controlling transmit power is configured to include a communication interface 210, a GPS receiving unit 220, a processor 230, a memory 240, a storage 250, and a power supply unit 260.

The communication interface 210 transmits the data signal to the base station 110 in a wireless communication scheme. Here, the communication interface 210 controls transmit power of the data signal depending on a control of the processor 120.

The GPS receiving unit 220 receives the GPS signal and measures the RSSI of the GPS signal. Generally, in a GPS, five bands L1 to L5 divided from an entire band are used. Among them, a band L1 of 1575.42 MHz (10.23 MHz×154) and a band L2 of 1227.60 MHz (10.23 MHz×120) are used by the public.

The processor 230 transmits the data signal including the data stored in the storage 250 to the base station 110 through the communication interface 210 depending on a command stored in the memory 240. Here, the processor 230 calculates a position of the apparatus 130 for controlling transmit power depending on the GPS signal, and calculates a distance between the apparatus 130 for controlling transmit power and the base station 110 using the corresponding position. Here, a position of the base station 110 may be pre-stored in one or more of the memory 240 and the storage 250. The processor 230 calculates path loss depending on the distance between the apparatus 130 for controlling transmit power and the base station 110 and the RSSI, and calculates the transmit power depending on the path loss. The processor 230 controls the communication interface 210 depending on the calculated transmit power to transmit the data signal to the base station 110.

The memory 240 loads a command that is interpretable by the processor 230 for controlling the transmit power from the storage 250 and stores the loaded command therein. The memory 240 may be a volatile memory such as a random access memory (RAM), or the like.

The storage 250 stores the above-mentioned command and the data to be included in the data signal therein. The storage 250 may be a non-volatile storage medium such as a hard disk, a flash memory, or the like. The power supply unit 260 provides power required for operating the above-mentioned respective functional units. The power supply unit 260 may include the known type of battery.

Hereinafter, processes of controlling transmit power of data signal by the apparatus for controlling transmit power described above will be described in detail.

Figure 3:
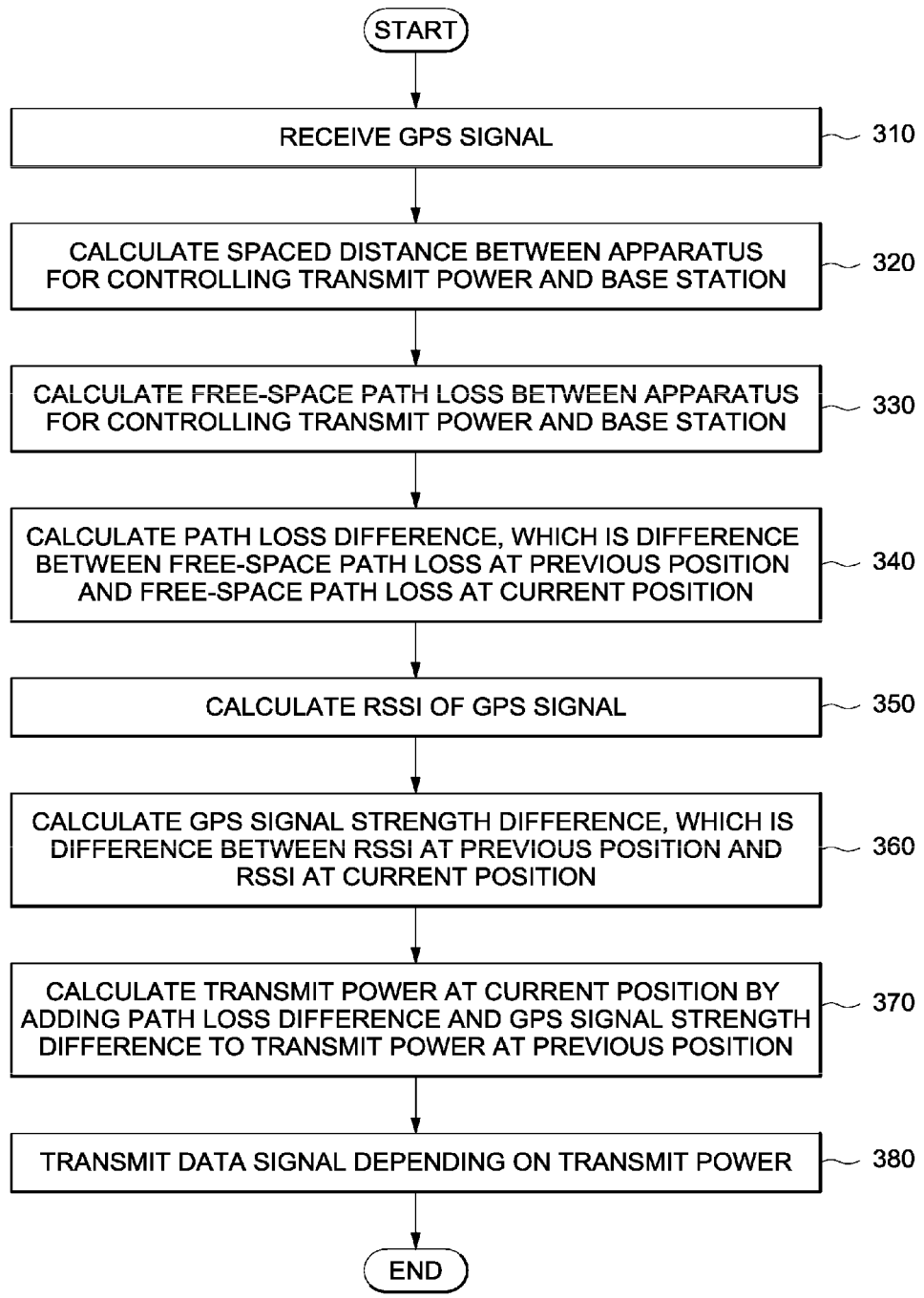
FIG. 3 is a flow chart illustrating processes of controlling transmit power by the apparatus for controlling transmit power according to an exemplary embodiment of the present invention.
Figure 4:
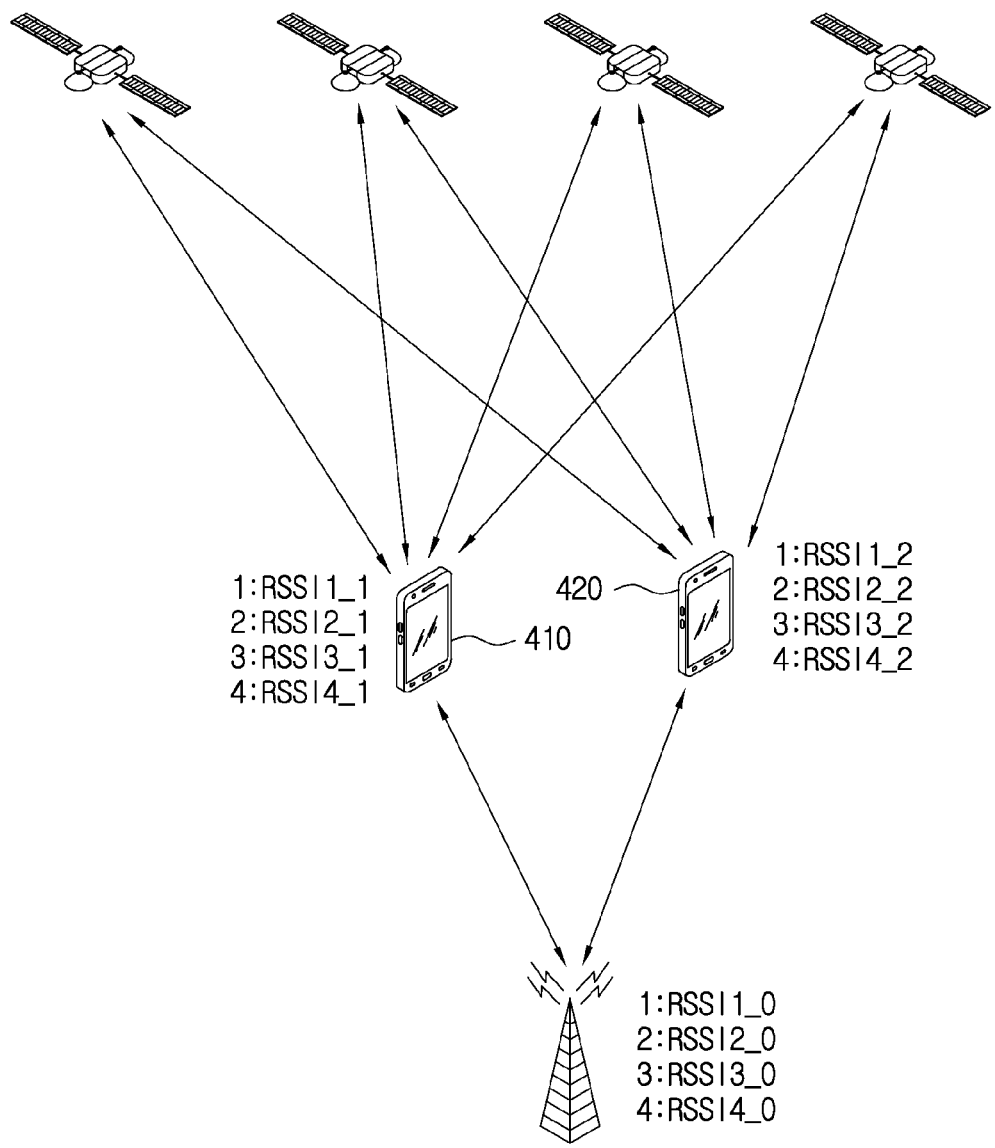
FIG. 4 is a view conceptually illustrating that the apparatus for controlling transmit power according to an exemplary embodiment of the present invention receives global positioning system (GPS) signals at different positions.

FIG. 3 is a flow chart illustrating processes of controlling transmit power by the apparatus for controlling transmit power according to an exemplary embodiment of the present invention. FIG. 4 is a view conceptually illustrating that the apparatus for controlling transmit power according to an exemplary embodiment of the present invention receives GPS signals at different positions.

Referring to FIG. 3, in step 301, the apparatus 130 for controlling transmit power receives a GPS signal transmitted from a satellite. Here, the apparatus 130 for controlling transmit power may receive GPS signals from each of a plurality of satellites.

In step 320, the apparatus 130 for controlling transmit power calculates a spaced distance, which is a distance between the apparatus 130 for controlling transmit power and the base station. Here, the apparatus 130 for controlling transmit power may pre-store the position of the base station, and calculate the position of the apparatus 130 for controlling transmit power using the GPS signal depending on the known method. Therefore, the apparatus 130 for controlling transmit power may calculate the distance between the pre-stored position of the base station and the position of the apparatus 130 for controlling transmit power. In step 330, the apparatus 130 for controlling transmit power calculates free-space path loss (FSPL), which is path loss between the apparatus 130 for controlling transmit power and the base station 110 when it is assumed that a space between the apparatus 130 for controlling transmit power and the base station 110 is a free space in which an obstacle is not present. Here, the apparatus 130 for controlling transmit power may calculate the FSPL as represented by the following Equation 1.

$$\text{FSPL (dB)}=20\times\log(d)+20\times\log(f)-147.55 \qquad \text{[Equation 1]}$$

Here, d indicates the spaced distance, and f means a frequency of the data signal that is to be transmitted by the apparatus 130 for controlling transmit power.

In step 340, the apparatus 130 for controlling transmit power calculates a path loss difference, which is a difference between FSPL at the previous position and FSPL at the current position. Here, the previous position is a position in which the apparatus 130 for controlling transmit power performs a process of controlling the previous transmit power as in 410 of FIG. 4. The apparatus 130 for controlling transmit power may perform processes from step 310 at the current position (for example, a position of 420) as a preset event informing a predefined period or a transmission point in time of the data signal occurs. In addition, the apparatus 130 for controlling transmit power may store the FSPL and transmit power at the previous position.

In step 350, the apparatus 130 for controlling transmit power calculates an RSSI of the GPS signal received in step 310. Here, the apparatus 130 for controlling transmit power may calculate an average of RSSIs of the respective GPS signals as an RSSI of a GPS signal corresponding to the current position in the case in which it receives the GPS signals from the plurality of satellites.

In step 306, the apparatus 130 for controlling transmit power calculates a GPS signal strength difference, which is a difference between an RSSI of a GPS signal corresponding to the previous position and the RSSI of the GPS signal corresponding to the current position. Here, the apparatus 130 for controlling transmit power may pre-store the RSSI of the GPS signal corresponding to the previous position.

In step 370, the apparatus 130 for controlling transmit power calculates transmit power corresponding to the current position by adding the path loss difference and the GPS signal strength difference to the transmit power corresponding to the previous position. That is, the apparatus 130 for controlling transmit power may calculate the transmit power corresponding to the current position as represented by the following Equation 2. Then, the apparatus 130 for controlling transmit power may store the RSSI of the GPS signal corresponding to the current position and the FSPL and the transmit power at the current position and use the RSSI of the GPS signal corresponding to the current position and the FSPL and the transmit power at the current position in the case in which it will again control transmit power later.

$$\text{TxPower2=TxPower1+(FSPL at Current Position-FSPL at Previous Position)+(RSSI of GPS Signal Corresponding to Current Position-RSSI of GPS Signal Corresponding to Previous Position)} \qquad \text{[Equation 2]}$$

Here, TxPower1 means transmit power of the previous position 410, and TxPower2 means transmit power of the current position 420.

For example, assume that RSSI1_1, RSSI2_1, RSSI3_1, and RSSI4_1, which are RSSIs of the respective GPS signals corresponding to the previous position 410, are −100 dBm, respectively, a spaced distance at the previous position 410 is 1 meter, and a used frequency is 400 MHz, as illustrated in FIG. 4. In addition, assume that RSSI1_2, RSSI2_2, RSSI3_2, and RSSI4_2, which are RSSIs of the respective GPS signals corresponding to the current position 420, are −95 dBm, respectively, a spaced distance at the current position 420 is 100 meters, and a used frequency is 400 MHz.

The apparatus 130 for controlling transmit power may calculate −100 dBm, which is an average of RSSI1_1, RSSI2_1, RSSI3_1, and RSSI4_1 corresponding to the previous position 410, and calculate −95 dBm, which is an average of RSSI1_2, RSSI2_2, RSSI3_2, and RSSI4_2 corresponding to the current position 420.

The apparatus 130 for controlling transmit power may calculate the FSPL corresponding to the previous position 410 as represented by the following Equation 3.

$$\text{FSPL of Previous Position}=20\times\log(1)+20\times\log(400{,}000{,}000)-147.55=24.49 \text{ dB} \qquad \text{[Equation 3]}$$

In addition, the apparatus 130 for controlling transmit power may calculate the FSPL corresponding to the current position 420 as represented by the following Equation 4.

$$\text{FSPL of Current Position}=20\times\log(100)+20\times\log(400{,}000{,}000)-147.55=64.49 \text{ dB} \qquad \text{[Equation 4]}$$

The apparatus 130 for controlling transmit power may calculate the transmit power corresponding to the current position 420 as represented by the following Equation 5 by applying a numerical value calculated in the process described above in the above Equation 2.

$$\text{TxPower2=TxPower1+40+5} \qquad \text{[Equation 5]}$$

The apparatus 130 for controlling transmit power described above may be applied to various unidirectional communication systems. For example, the apparatus 130 for controlling transmit power may be applied to a radio sonde. The radio sonde is a measuring apparatus of observing weather states (pressure, temperature, humidity, and the like) of an upper layer of the atmosphere and transmitting an observation result to the ground. The radio sonde transmits information on the weather states of the upper layer measured by a barometer, a thermometer, a hygrometer, and the like, installed in a balloon through a small wireless transmitter, and the base station 110 collects this information. The radio sonde may not be recovered after it is used once. A radio sonde terminal has a unidirectional system transmitting information to the base station mainly using a frequency of 400 to 406 MHz.

A communication apparatus transmitting data to the ground, a GPS receiving apparatus recognizing a position of the radio sonde terminal, various sensors such as a barometer, a thermometer, a hygrometer, an anemometer, and the like, and a balloon are present in the radio sonde terminal. Gas flying the balloon is injected into the balloon. This gas is used in proportion to a weight of the radio sonde terminal other than the balloon, and occupies a significant portion in an entire cost of the radio sonde terminal.

A weight of a battery in the radio sonde terminal occupies a significant portion, and since a decrease in the weight of the battery has a significant influence on a cost of the radio sonde and environment protection, it is important to decrease a capacity and the weight of the battery by adjusting transmit power of the radio sonde.

Therefore, in the case in which the apparatus 130 for controlling transmit power according to an exemplary embodiment of the present invention is implemented to be the radio sonde, the apparatus 130 for controlling transmit power may be implemented to additionally include sensors measuring an environment to generate data, such as a barometer, a thermometer, a hygrometer, and the like, in addition to the functional units of FIG. 2 described above, and since the transmit power of the data signal is controlled through the above-mentioned processes, consumption of power for transmission of the data signal may be decreased. That is, the apparatus 130 for controlling transmit power according to an exemplary embodiment of the present invention may be implemented to be the radio sonde terminal so as to perform a step of measuring the environment through the sensors to generate the data.

According to an exemplary embodiment of the present invention, transmit power of a terminal transmitting a signal in a unidirectional communication system is controlled, thereby making it possible to decrease power loss of the terminal.

Program commands recorded in a storage medium may be especially designed and constituted for the present invention or be known to those skilled in a software field. An example of the storage medium includes a magnetic medium such as a hard disk, a floppy disk, or a magnetic tape; an optical recording medium such as a compact disk read only memory (CD-ROM) or a digital versatile disk (DVD); a magneto-optical medium such as a floptical disk; and a hardware apparatus specially configured to store and perform program commands, such as a ROM, a random access memory (RAM), a flash memory, or the like. An example of the program commands includes a high-level language code capable of being executed by an apparatus electronically processing information using an interpreter, or the like, for example, a computer, as well as a machine language code made by a compiler.

The above-mentioned hardware apparatus may be constituted to be operated as at least one software module in order to perform an operation according to the present invention, and vice versa.

Although the present invention has been described above with reference to exemplary embodiments of the present invention, it may be understood by those skilled in the art that the present invention may be variously modified and altered without departing from the scope and spirit of the invention as disclosed in the following claims.

What is claimed is:

1. An apparatus for controlling transmit power, comprising:
a global positioning system (GPS) receiving unit receiving GPS signals from one or more satellites and measuring signal strengths of the GPS signals;
a processor calculating transmit power corresponding to a current position depending on the GPS signals according to a predefined command;
a memory storing the command therein; and
a communication interface transmitting a data signal including data,
wherein the command includes commands for performing:
calculating free-space path loss (FSPL) between the current position and a base station depending on the GPS signals;
calculating an FSPL difference, which is a difference between FSPL at a previous position and FSPL at the current position;
calculating a GPS signal strength difference, which is a difference between an average of strengths of the respective GPS signals corresponding to the previous position and an average of strengths of the respective GPS signals corresponding to the current position; and
calculating the transmit power corresponding to the current position by adding transmit power corresponding to the previous position, the FSPL difference, and the GPS signal strength difference to one another, and
wherein an environment is measured to generate the data, and
wherein the communication interface transmits the data signal including the data depending on the calculated transmit power.

2. The apparatus for controlling transmit power of claim 1, wherein the calculating of the FSPL between the current position and the base station depending on the GPS signals includes:
calculating a spaced distance between the current position and the base station; and
calculating the FSPL between the current position and the base station depending on the spaced distance.

3. The apparatus for controlling transmit power of claim 1, wherein the command further includes a command for performing: storing the FSPL between the current position and the base station, the transmit power at the current position, and the strengths of the GPS signals corresponding to the current position.

4. The apparatus for controlling transmit power of claim 1, further comprising a sensor measuring an environment to generate the data.

5. A method for controlling transmit power by an apparatus for controlling transmit power, comprising:
receiving GPS signals from one or more satellites;
measuring signal strengths of the GPS signals;
calculating FSPL between a current position and a base station depending on the GPS signals;
calculating an FSPL difference, which is a difference between FSPL at a previous position and FSPL at the current position;
calculating a GPS signal strength difference, which is a difference between an average of strengths of the respective GPS signals corresponding to the previous position and an average of strengths of the respective GPS signals corresponding to the current position;
calculating transmit power corresponding to the current position by adding transmit power corresponding to the previous position, the FSPL difference, and the GPS signal strength difference to one another;
measuring an environment to generate data; and transmitting a data signal including the data depending on the calculated transmit power.

6. The method for controlling transmit power of claim 5, wherein the calculating of the FSPL between the current position and the base station depending on the GPS signals includes:

calculating a spaced distance between the current position and the base station; and calculating the FSPL between the current position and the base station depending on the spaced distance.

7. The method for controlling transmit power of claim 5, further comprising storing the FSPL between the current position and the base station, the transmit power at the current position, and the strengths of the GPS signals corresponding to the current position.

* * * * *